3,255,266
PROCESS FOR THE RECOVERY OF CYCLOHEXANE
Ollie W. Chandler, Terre Haute, Ind., assignor to Commercial Solvent Corporation, New York, N.Y., a corporation of Maryland
No Drawing. Filed July 6, 1961, Ser. No. 122,116
2 Claims. (Cl. 260—666)

My invention relates to the production of cyclohexanol by the reaction of methanol and cyclohexylnitrite. More particularly, my invention relates to the production of cyclohexanol by the treatment of the reaction product of nitric acid and cyclohexane containing cyclohexylnitrite, with methanol.

Nitrocyclohexane, an important intermediate in the formation of caprolactam, is produced by the reaction of cyclohexane and nitric acid at elevated temperatures and pressures according to the disclosure in U.S. Patent 2,343,534 issued March 7, 1944, to R. N. Cavanaugh et al. The conversion of cyclohexane to nitrocyclohexane is relatively low with often as high as 80–90% of utilized cyclohexane being unreacted. Therefore, it is necessary, in order to produce nitrocyclohexane on a commercial basis, to recover cyclohexane from the reaction mixture for later reaction with nitric acid. Cyclohexane is conveniently recovered in high yields according to the process described in my copending application Serial No. 91,504 filed February 24, 1961, now abandoned, which consists of subjecting the nitration reaction mixture to steam distillation and recovering cyclohexane in the form of an azeotrope of cyclohexane and water.

Besides nitrocyclohexane, by-products such as cyclohexanone, cyclohexylnitrate, and cyclohexylnitrite are produced by the nitration reaction. Because of the large amounts of these by-products produced during the repeated nitration of recycled cyclohexane, especially cyclohexylnitrite, it becomes necessary for the commercial operation of the process to recover and use these by-products. However, cyclohexylnitrite, the main by-product of the reaction, often being present in amounts as high as 10–20% of the entire nitration reaction product, is thermally decomposed when subjected to the temperatures required by the azeotropic distillation procedures previously mentioned, thus resulting in a great loss of material.

I have now discovered a process whereby cyclohexylnitrite can be converted to commercially valuable cyclohexanol which is not altered or adversely affected by the temperatures of distillation used in the cyclohexane recovery.

My process generally consists of treating a solution containing cyclohexylnitrite such as the reaction product of nitric acid and cyclohexane with methanol thus converting the cyclohexylnitrite to cyclohexanol. In carrying out my process, one mole of methanol is theoretically needed to convert each mole of cyclohexylnitrite in the solution to cyclohexanol. However, to insure complete conversion, it is generally preferable to use an amount of methanol in excess of theoretical. After the treatment with methanol, the cyclohexane contained in the nitration reaction mixture can be recovered by the previously described azeotropic distillation without concurrent destruction of the now present cyclohexanol.

The following example serves to illustrate my process. It is to be understood, however, that my process is not limited to the specific operating conditions or procedures contained therein.

*Example*

A portion of the reaction product of cyclohexane and nitric acid having the following composition:

|  | Grams |
|---|---|
| Cyclohexane | 858.0 |
| Nitrocyclohexane | 113.0 |
| Cyclohexylnitrite | 11.4 |
| Cyclohexanone | 1.0 |
| Cyclohexanol | 3.0 |
| 1-nitrocyclohexene | 7.0 |
| Unknown | 1.0 | was treated with 8 grams of methanol and allowed to stand at room temperature for a 12-hour period. At the end of the 12-hour period, the methanol-treated material was steam distilled in a distillation column utilizing a reflux ratio of 1.5:1, a temperature in the lower portion of the column of about 99–100° C. and a temperature in the upper part of the column of about 70–75° C. to remove cyclohexane as the azeotrope of cyclohexane and water. The remaining unremoved material was found to contain 15.5 grams of cyclohexanol thus showing a conversion of over 90% of the cyclohexylnitrite contained in the undistilled product to cyclohexanol without concurrent decomposition.

Now having described my invention, what I claim is:

1. In a process for recovering cyclohexane from the reaction product of cyclohexane and nitric acid by distillation without concurrent decomposition of cyclohexylnitrite contained therein, said reaction product comprising cyclohexane, nitrocyclohexane and cyclohexylnitrite, the improvement which comprises treating the reaction product with methanol in mole ratios of at least 1 mole of methanol for each mole of cyclohexylnitrite contained in the reaction product to form cyclohexanol and thereafter recovering said cyclohexane from this reaction mixture by distillation.

2. In a steam distillation for recovering cyclohexane from the reaction products of cyclohexane with nitric acid to produce nitrocyclohexane and by-product cyclohexylnitrite, said reaction product comprising cyclohexane, nitrocyclohexane, and cyclohexylnitrite, the improvement which comprises adding methanol to the reaction products in a mole ratio of at least 1 mole of methanol for each mole of cyclohexylnitrite contained in the reaction products to form cyclohexanol, and thereafter steam distilling the reaction mixture to recover cyclohexane as overhead.

References Cited by the Examiner

UNITED STATES PATENTS

| 2,343,534 | 3/1944 | Cavanaugh et al. | 260—533 X |
| 2,465,984 | 3/1949 | Doumani et al. | 260—533 X |
| 2,503,119 | 4/1950 | McKinnis | 260—466 |
| 2,918,487 | 12/1959 | Patterson et al. | 260—533 X |
| 2,978,473 | 4/1961 | Chafetz et al. | 260—533 X |
| 3,021,348 | 2/1962 | Kuceski | 260—644 |

DELBERT E. GANTZ, *Primary Examiner.*

ALPHONSO D. SULLIVAN, *Examiner.*

C. E. SPRESSER, *Assistant Examiner.*